United States Patent Office 3,649,626
Patented Mar. 14, 1972

3,649,626
FUSED RING SYSTEMS CONTAINING
[1,3]OXAZINE
Max von Strandtmann, Rockaway, Marvin P. Cohen, New Milford, and John Shavel, Jr., Mendham, N.J., assignors to Warner-Lambert Company, Morris Plains, N.J.
No Drawing. Continuation-in-part of application Ser. No. 673,927, Oct. 9, 1967. This application Apr. 27, 1970, Ser. No. 32,358
Int. Cl. C07d 87/20, 99/02
U.S. Cl. 260—244 R
11 Claims

ABSTRACT OF THE DISCLOSURE

Fused ring systems containing [1,3]oxazine of Formula I and the method for their preparation have been disclosed.

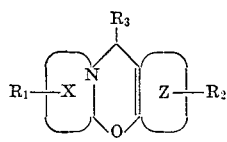

(I)

X represents 1,2,3,4-tetrahydroisoquinoline, 1,2,3,4-tetrahydro-2-carboline, tetrahydro-4-phthalazinone, 1,2-dihydroquinazoline, hexahydropyrimidine; Z is an aromatic or heteroaromatic nucleus, $R_1$, $R_2$ and $R_3$ are hydrogen or various substituents. The compounds of this invention are hypotensive agents.

This application for U.S. Letters Patent is a continuation-in-part of copending application U.S. Ser. No. 673,927, filed Oct. 9, 1967, now abandoned.

The present invention relates to a new class of fused ring systems containing [1,3]oxazines of Formula I and the method for their preparation.

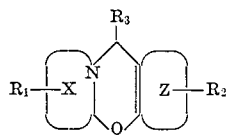

(I)

X represents 1,2,3,4-tetrahydroisoquinoline, 1,2,3,4-tetrahydro-2-carboline, tetrahydro-4-phthalazinone, 1,2-dihydroquinazoline, and hexahydropyrimidine; Z is benzene, naphthalene, phenanthrene, pyridine, quinoline, isoquinoline, indole, carbazole; $R_1$ and $R_2$ are hydrogen, lower alkyl, aryl lower alkyl, aryl, amino, lower alkylamino, aralkylamino, hydroxy, lower alkoxy, methylenedioxy, halogen, carbo lower alkoxy, carboxy, dilower alkylaminocarbanyl, dilower alkylamino lower alkyl; $R_3$ is hydrogen, lower alkyl or lower alkyl, aryl.
In the above definitions for $R_1$, $R_2$, and $R_3$ and X and Z, lower alkyl and the lower alkyl portion of lower alkoxy is meant to include from 1 to 6 carbon atoms, such as methyl, ethyl, propyl, isopropyl, and the like; halogen is meant to include all four members of its family, i.e., bromine, fluorine, iodine, and chlorine.

This invention also includes within its scope a novel method for the preparations of these compounds.

The compounds of this invention are hypotensive agents. They are useful in the treatment of mild hypertension in mammals, such as dogs, cats, monkeys and the like. They are administered orally or parenterally, preferably intravenously, at a dose of 1 to 10 mg. per kilogram body weight of the mammal several times daily in order to produce the desired hypotensive effects. This, for a mammal weighing about 70 kg., a dose of 70 to 700 mg. several times daily is recommended.

The compounds of this invention may be formulated with standard pharmaceutical carriers, such as water, lactose, mannitol, starch and the like, to form dosage forms such as tablets, capsules, suspensions, and the like. They may also be formulated with liquid vehicles, such as water or saline, to give dosage forms suitable for intravenous or intramuscular injections.

The above compounds are prepared by heating a phenolic Mannich base of Formula II,

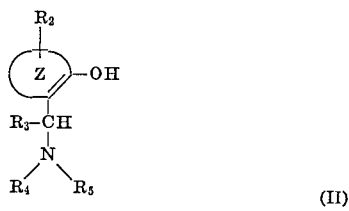

(II)

wherein $R_4$ and $R_5$ are lower alkyl or lower alkyl aryl, or $R_4$ and $R_5$ taken together with the nitrogen atom to which they are attached form a morpholine, pyrrolidine, piperazine or piperidine ring, in dioxane at reflux temperature with an equivalent amount of a partially reduced heteroaromatic compound having an activated C=N function of Formula III

(III)

until no compound of the Formula IV

(IV)

is detectable in the vapors by odor or pH measurements. Compound IV is a by-product of the main reaction. At this point the solvent is removed under reduced pressure and the residue recrystallized. Other suitable solvents for this reaction are: tetrahydrofuran, toluene, xylene and the like.

The starting phenolic Mannich bases II are prepared according to the methods described in "α-Aminoalkylierung" by H. Hellmann and G. Opitz, Verlag Chemie G.M.B.H. Weinheim, Germany 1960 or by the methods disclosed in J. Org. Chem., 27, p. 1211, January 1962. Some starting compounds of Type II such as 1-dimethylamino-2-naphthol are available from Aldrich Chem. Co. A suitable general procedure for the preparation of phenolic Mannich bases of type II is as follows: A solution of 0.1 mole of the appropriate phenol, 5.4 g. of dimethylamine and 8.5 ml. of 37% formaldehyde in 200 ml. ethanol is refluxed for 5 hours and allowed to stand overnight at 0 to 5° C. The precipitate formed is removed by filtration and recrystallized from anhydrous ethanol.

Starting materials of type III were prepared by known literature procedures described, for example, by R. C. Elderfield in "Heterocyclic Compounds," vol. 4, p. 349, John Wiley and Sons, Inc., New York, 1952. Starting materials of type III can also be prepared according to the methods described by Whaley et al. in Organic Reactions, vol. VI, Chapter 2, particularly pages 104 and 142.

3,4-dihydro-β-carboline is described by Schopf et al., in Ann. 558: 124 (1947); 6,7-dimethoxy-3,4-dihydroisoquinoline by Haworth, in J. Chem. Soc., (1927) 2281; 6-methoxy-3,4-dihydroisoquinoline by Gulland and Vinden, J. Chem. Soc., (1929) 1791; 3-carbethoxy-4-dimethylamino-methyl-5-hydroxy-2-methylindole by Bell et al., J. of Med. Chem., vol. 10, 264 (1967); and 6-dimethylaminoethyl-2-methoxyphenol by Eliel, J. Amer. Chem. Soc., 73, 43 (1951). 1(2H)-phthalazinone is also available from Aldrich Chem. Co.

In general, compounds of type III are prepared by the Bischler-Napieralski cyclization of the corresponding N-formyl aralkylamine which involves refluxing the latter in toluene or xylene in the presence of a dehydrating agent such as $P_2O_5$ or $POCl_3$.

The compounds of our invention may be converted into their pharmaceutically acceptable nontoxic acid addition and quaternary ammonium salts by conventional procedures. Exemplary of nontoxic acid addition salts are those formed with acetic, maleic fumaric, succinic, tartaric, citric, malic, cinnamic, sulfonc, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-tolune sulfonate.

The following examples are included in order further to illustrate the invention.

EXAMPLE 1

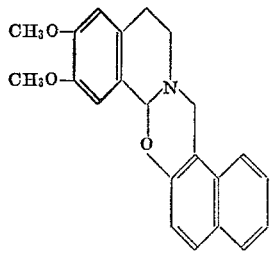

12,13-dihydro-9,10-dimethoxy-7aH,15H-benz[f]isoquino[1,2-b][1,3]benzoxazine

A solution of 3.82 g. of 3,4-dihydro-6,7-dimethoxy-isoquinoline, and 4 g. of 1-dimethylaminomethyl-2-naphthol in 20 ml. of dioxane was refluxed under a stream of nitrogen for 3 hr. The solution was cooled, and the crystalline precipitate was filtered, washed with cold dioxane, and recrystallized from $CH_3CN$. M.P. 185–187°; yield 2.5 g. (36%); $\lambda_{max}$ m$\mu$ ($\epsilon$) 229 (97,000); 277 (12,700), 310 (7,600); $\nu_{max}$ 755 (m.), 825 (ms.), 860 (ms.), 975 (mw.), 1015 (m.), 1100 (ms.), 1125 (s.), 1225 (s.), 1265 (ms.), 1515 (m.), 1600 (m.), 1625 (mw.) cm.$^{-1}$.

Analysis.—Calcd. for $C_{22}H_{21}NO_3$ (percent): C, 76.06; H, 6.09; N, 4.03. Found (percent): C, 76.13; H, 6.02; N, 4.15.

EXAMPLE 2

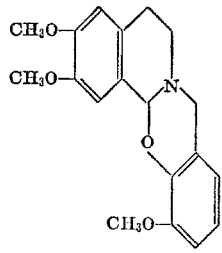

5,6-dihydro-2,3,12-trimethoxy-8H,13aH-isoquino[1,2-b][1,3]benzoxazine

A solution of 10 g. of 3,4-dihydro-6,7-dimethoxy-iso-quinoline, and 9.5 g. of 6-methoxy-α-dimethylamino-o-cresol in 50 ml. of dioxane was refluxed under a stream of nitrogen for 72 hr. The solvent was removed under reduced pressure, and the residual oil was recrystallized from ethylacetate; M.P. 152–164°; yield 3.5 g. (20%); $\lambda_{max}$ m$\mu$ ($\epsilon$) 237 (35,600), 281 (6,800), 310 (1,680), 324 (1,640); $\nu_{max}$ 725 (mw.), 810 (mw.), 960 (mw.), 1070 (m.), 1115 (m.), 1160 (ms.), 1225 (ms.), 1250 (s.), 1510 (m.), 1590 (mw.), 1610 (mw.), cm.$^{-1}$.

Analysis.—Calcd. for $C_{19}H_{21}NO_4$ (percent): C, 69.70; H, 6.47; N, 4.28. Found (percent): C, 69.63; H, 6.57; N, 4.36.

EXAMPLE 3

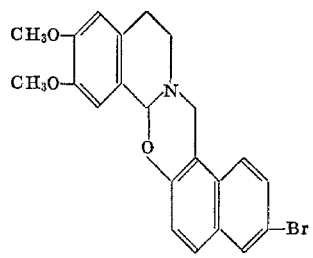

3-bromo-12,13-dihydro-9,10-dimethoxy-7aH,15H-benz[f]isoquino[1,2-b][1,3]benzoxazine This was prepared from 3.82 g. of 3,4-dihydro-6,7-dimethoxyisoquinoline, and 5.6 g. of 6-bromo-1-dimethyl-aminomethyl-2-naphthol in analogous fashion to 12,13-dihydro - 9,10-dimethoxy-7aH,15H-benz[f]isoquino[1,2-b][1,3]benzoxazine. Recrystallized from $CH_3CN$, M.P. 200–201°; yield 3 g. (35%); $\lambda_{max}$ m$\mu$ ($\epsilon$) 234 (100,000), 270 (11,600), 278 (13,200), 310 (7,300); $\nu_{max}$ 740 (mw.), 805 (m.), 830 (ms.), 945 (m.), 1010 (mw.), 110 (m.), 1120 (ms.), 1220 (s.), 1265 (ms.), 1520 (m.), 1590 (m.), 1615 (m.), cm.$^{-1}$.

Analysis.—Calcd. for $C_{22}H_{20}BrNO_3$ (percent): C, 61.98; H, 4.73; N, 3.29. Found (percent): C, 62.25; H, 5.01; N, 3.54.

EXAMPLE 4

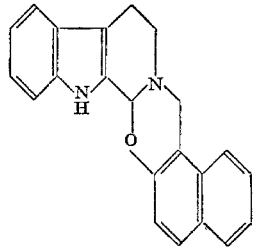

7,8,13,13b-tetrahydro-5H-naph[1″,2″:5′,6′][1,3]oxazine[3′,2′:1,2]pyrido[3,4-b]indole This was prepared from 6.8 g. of 3,4 dihydro-β-carboline, and 10 g. of 1-dimethylaminomethyl-2-naphthol in analogous fashion to 12,13-dihydro-9,10-dimethoxy-7aH,15H-benz[f]isoquino[1,2-b][1,3]benzoxazine. The product was recrystallized from ethanol-tetrahydrofuran, M.P. 200.5–202.5°; yield 4.3 g. (26%); $\lambda_{max}$ m$\mu$ ($\epsilon$) 229 (85,-900), 265 (6,800), 278 (8,400), 289 (9,100), 319 (15,-300); $\nu_{max}$ 740 (ms.), 800 (m.), 890 (ms.), 935 (mw.), 1010 (mw.), 1110 (m.), 1220 (s.), 1600 (m.), 1625 (m.), 3390 (ms.), cm.$^{-1}$.

Analysis.—Calcd. for $C_{22}H_{18}N_2O$ (percent): C, 80.95; H, 5.56; N, 8.58. Found (percent): C, 80.83; H, 5.55; N, 8.48.

EXAMPLE 5

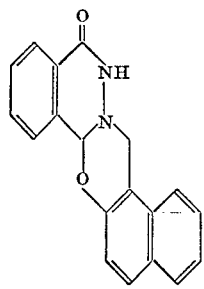

5,15a-dihydro-6H,8H-naphth[1',2':5,6]oxazino-
[2,3-a]phthalazin-5-one

A solution of 2.92 g. of 1(2H)-phthalazinone and 4 g. of 1-dimethylaminomethyl-2-naphthol in 20 ml. of dioxane was refluxed under a stream of nitrogen for 18 hrs. and cooled. The crystalline precipitate was filtered, and recrystallized from abs. ethanol M.P. 183–185.5°; yield 3 g. (50%); $\lambda_{max}$ m$\mu$ ($\epsilon$) 211 (56,000), 227 (72,400), 279 (10,200), 288 (10,000); $\lambda_{max}$ 680 (m), 750 (m), 725 (ms), 900 (m), 1005 (mw), 1155 (mw), 1235 (ms), 1585 (ms), 1605 (m), 1635 (s), 3075 (m) cm.$^{-1}$.

*Analysis.*—Calcd. for $C_{19}H_{14}N_2O_2$ (percent): C, 75.48; H, 4.67; N, 9.27. Found (percent): C, 75.34; H, 4.64; N, 9.49.

EXAMPLE 6

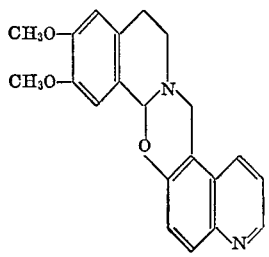

12,13-dihydro-9,10-dimethoxy-7aH,15H-quino-
[5',6':5,6][1,3]oxazino[2,3-a]isoquinoline A solution of 7.5 g. of 5-dimethylaminomethyl-6-quinolinol, and 7.1 g. of 3,4-dihydro-6,7-dimethoxyisoquinoline in 75 ml. of dioxane was refluxed under a stream of nitrogen for 4 hr. The solution was filtered free of a small amount of insoluble material, and the filtrate was taken down to a gum under reduced pressure. The gum was recrystallized from abs. ethanol, M.P. 175–177°; yield 2 g. (15%), $\lambda_{max}$ m$\mu$ ($\epsilon$) 233 (50,400), 282 (10,000), 313 (7,500); $\lambda_{max}$ 790 (m.), 825 (ms.), 950 (mw.), 1010 (mw.), 1100 (ms.), 1130 (ms.), 1215 (s.), 1260 (m.), 1500 (m.), 1515 (m.), 1610 (m.) cm.$^{-1}$.

*Analysis.*—Calcd. for $C_{21}H_{20}N_2O_3$ (percent): C, 72.39; H, 5.79; N, 8.04. Found (percent): C, 72.62; H, 5.74; N, 8.32.

EXAMPLE 7

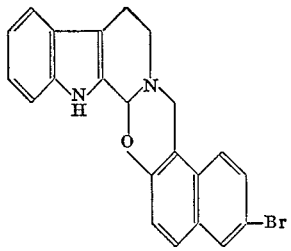

2-bromo-7,8,1,3,13b-tetrahydro-5H-naphth[1",2":5',6']
[1,3]oxazino[3',2':1,2]pyrido[3,4-b]indole This was prepared from 3.4 g. of 3,4-dihydro-β-carboline, and 5.6 g. of 6-bromo-1-dimethylaminomethyl-2-naphthol in analogous fashion to 7,8,13,13b-tetrahydro-5H - naphth[1",2":5',6'][1,3]oxazino[3',2':1,2]pyrido-[3,4-b]indole. The material was recrystallized from pyridine, M.P. 209–211°; yield 2 g. (25%); $\lambda_{max}$ m$\mu$ ($\epsilon$) 235 (74,000), 267 (5,500), 279 (6,700), 290 (7,100), 319 (12,800); $\lambda_{max}$ 735 (ms.), 800 (m.), 860 (ms.), 930 (m.), 985 (m.), 1010 (m.), 1060 (m.), 1120 (m.), 1220 (s.), 1590 (m.), 1615 (m.), 3400 (ms.) cm.$^{-1}$.

*Analysis.*—Calcd. for $C_{22}H_{17}BrN_2O$ (percent): C, 65.20; H, 4.23; N, 6.91. Found (percent): C, 65.31; H, 4.43; N, 6.76.

EXAMPLE 8

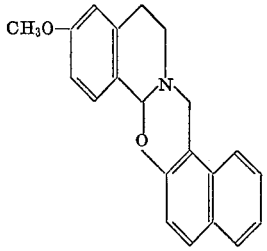

12,13-dihydro-9-methoxy-7aH,15H-benz[f]
isoquino[1,2-b][1,3]benzoxazine

A solution of 3.22 g. of 3,4-dihydro-6-methoxyisoquinoline, and 4.02 g. of 1-dimethylaminomethyl-2-naphthol in 20 ml. of dioxane was refluxed under a stream of nitrogen for 3 hr. The mixture was chilled, and the crystalline precipitate was filtered, and recrystallized from toluene, M.P. 191–193°; yield 2 g. (31%); $\lambda_{max}$ m$\mu$ ($\epsilon$), 228 (83,400); 277 (19,100); $\lambda_{max}$ 765 (mw.), 815 (ms.), 855 (ms.), 940 (m.), 1030 (m.), 1125 (ms.), 1215 (s), 1260 (ms.), 1510 (m.), 1590 (m.), 1610 (m.), 1620 (m.) cm.$^{-1}$.

*Analysis.*—Calcd. for $C_{21}H_{19}NO_2$ (percent): C, 79.47; H, 6.03; N, 4.41. Found (percent): C, 79.53; H, 6.03; N, 414.

EXAMPLE 9

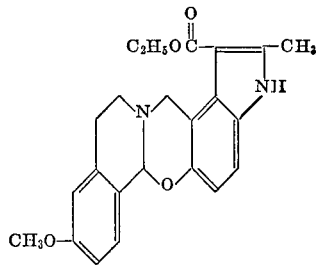

Ethyl 3,11,12,14-tetrahydro-9-methoxy-2-methyl-6aH-indolo[4,5':5,6]oxazino[2,3-a]isoquinoline - 1 - carboxylate A solution of 3.32 g. of 3,4-dihydro-6-methoxyisoquinoline, and 5.5 g. of ethyl 4-[(dimethylamino)methyl]-5-hydroxy-2-methylindolo-3-carboxylate in 20 ml. of dioxane was refluxed under a stream of nitrogen for 3 hrs. The dioxane was removed under reduced pressure, and the residue was recrystallized from ethyl acetate, M.P. 190.5–191.5°; yield 4.2 g. (54%); $\lambda_{max}$ m$\mu$ ($\epsilon$) 220 (39,200); 253 (21,500); $\lambda_{max}$ 780 (mw.), 920 (m.), 1065 (ms.), 1085 (ms.), 1150 (ms.), 1230 (s.), 1585 (m.), 1610 (m.), 1695 (ms.) cm.$^{-1}$.

*Analysis.*—Calcd. for $C_{23}H_{24}N_2O_4$ (percent): C, 70.39; H, 6.16; N, 7.14. Found (percent): C, 70.28; H, 6.28; N, 7.05.

It is understood that the foregoing detailed description is given merely by way of illustration and that many variations may be made therein without departing from the spirit of our invention.

Having described our invention, what we desire to secure by Letters Patent is:

1. A member selected from the group consisting of a free base of the formula:

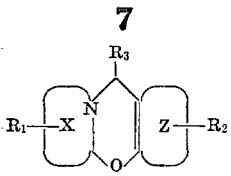

X represents 1,2,3,4-tetrahydroisoquinoline, 1,2,3,4-tetrahydro-2-carboline and tetrahydro-4-phthalazinone; Z is benzene, naphthalene, quinoline in which the quinoline is attached as follows:

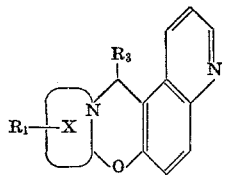

and indole in which the indole is attached as follows:

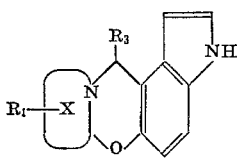

and when Z is quinoline or indole X is 1,2,3,4-tetrahydroisoquinoline and when X is 1,2,3,4-tetrahydro-2-carboline or tetrahydro-4-phthalazinone Z is naphthalene, $R_1$ and $R_2$ are hydrogen, lower alkyl, lower alkoxy, halogen, carbo lower alkoxy; and $R_3$ is hydrogen or its nontoxic pharmaceutically acceptable acid addition salts.

2. 12,13 - dihydro - 9,10 - dimethoxy - 7aH,15H-benz[f]isoquino[1,2 - b][1,3]benzoxazine or its nontoxic pharmaceutically acceptable acid addition salts.

3. 5,6 - dihydro - 2,3,12 - trimethoxy - 8H,13aH - isoquino[1,2-b][1,3]benzoxazine or its nontoxic pharmaceutically acceptable acid addition salts.

4. 3 - bromo - 12,13 - dihydro - 9,10 - dimethoxy - 7aH,15H - benz[f]isoquino[1,2-b][1,3]benzoxazine and its nontoxic pharmaceutically acceptable acid addition salts.

5. 7,8,13,13b - tetrahydro - 5H - naphth[1″,2″:5′,6′][1,3]oxazine[3′,2′:1,2]pyrido[3,4-b]indole or its nontoxic pharmaceutically acceptable acid addition salts.

6. 5,15a - dihydro - 6H,8H - naphth[1′,2′:5,6]oxazino[2,3-a[phthalazin - 5 - one or its nontoxic pharmacetutically acceptable acid addition salts.

7. 12,13 - dihydro - 9,10 - dimethoxy - 7aH,15H-quino[5′,6′:5,6][1,3]oxazino[2,3-a]isoquinoline or its nontoxic pharmaceutically acceptable acid addition salts.

8. 2 - bromo - 7,8,13,13b - tetrahydro - 5H - naphth[1‴,2″:5′,6′][1,3]oxazino[3′,2′:1,2]pyrido[3,4 - b]indole or its nontoxic pharmaceutically acceptable acid addition salts.

9. 12,13 - dihydro - 9 - methoxy - 7aH,15H - benz[f]isoquino[2,2-b][1,3]benzoxazine or its nontoxic pharmaceutically acceptable acid addition salts.

10. Ethyl 3,11,12,14 - tetrahydro - 9 - methoxy - 2-methyl - 6aH - indole[4′,5′:5,6]oxazino[2,3 - a]isoquinoline-1-carboxylate or its nontoxic pharmaceutically acceptable acid addition salts.

11. Process for the preparation of a free base of claim 1 which comprises containing a compound of the Formula II

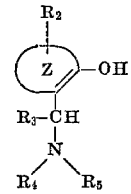

wherein $R_4$ and $R_5$ are lower alkyl or lower alkyl phenyl, or $R_4$ and $R_5$ taken together with the nitrogen atom to which they are attached form a morpholine, pyrrolidine, piperazine or piperidine ring, is heated in an enert solvent with an equivalent amount of a partially reduced heteroaromatic compound having an activated C=N function of Formula III

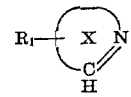

until no compound of the Formula IV

is detectable.

References Cited

UNITED STATES PATENTS 3,004,025   10/1961   Van Campen et al. __ 260—244 R

OTHER REFERENCES

Chemical Abstracts Subject Index (A–L) vol. 57, pages 1360S (third column) and 1361S (first column) (1962). QD1.A51.

Chemical Abstracts Subject Index (J–Z), vol. 60, page 2220S (1964). QD1.A51.

Patterson et al., The Ring Index 2nd ed. page 675, Wash. D.C., Amer. Chem. Soc. 1960. QD291.P3.

NATALIE TROUSOF, Primary Examiner

U.S. Cl. X.R.

260—247.2 R, 247.2 A, 247.2 B, 247.5 R, 247.5 B, 247.7 A, 250 A, 251 Q, 251 R, 256.4 C, 256.4 H, 268 TR, 268 BC, 268 BQ, 268 H, 268 R, 283 R, 287 R, 288 R, 289 R, 293.59, 293.61, 293.65, 295 C, 296 A, 326.3, 326.5 L, 326.5 N; 424—248